United States Patent
Wu et al.

(10) Patent No.: US 9,980,109 B2
(45) Date of Patent: May 22, 2018

(54) METHODS AND DEVICES FOR REPORTING BROADCAST STATE OF WARNING MESSAGE

(71) Applicant: ZTE Corporation, Shenzhen (CN)

(72) Inventors: Yunlu Wu, Shenzhen (CN); Yin Gao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days. days.

(21) Appl. No.: 14/787,523

(22) PCT Filed: Feb. 27, 2014

(86) PCT No.: PCT/CN2014/072620
§ 371 (c)(1),
(2) Date: Oct. 28, 2015

(87) PCT Pub. No.: WO2014/176946
PCT Pub. Date: Nov. 6, 2014

(65) Prior Publication Data
US 2016/0112857 A1    Apr. 21, 2016

(30) Foreign Application Priority Data
Apr. 28, 2013 (CN) .......................... 2013 1 0156325

(51) Int. Cl.
| | |
|---|---|
| *H04M 11/04* | (2006.01) |
| *H04W 4/22* | (2009.01) |
| *H04W 4/06* | (2009.01) |
| *H04W 72/00* | (2009.01) |
| *H04W 76/00* | (2018.01) |

(52) U.S. Cl.
CPC ............... *H04W 4/22* (2013.01); *H04W 4/06* (2013.01); *H04W 72/005* (2013.01); *H04W 76/002* (2013.01)

(58) Field of Classification Search
USPC ....................................... 455/404.1
See application file for complete search history.

(56) References Cited

U.S. PATENT DOCUMENTS

| | | | | |
|---|---|---|---|---|
| 2007/0077922 A1* | 4/2007 | Kim | ...................... | H04H 20/57 455/414.2 |
| 2011/0300886 A1* | 12/2011 | Hapsari | .................. | H04H 20/57 455/500 |

FOREIGN PATENT DOCUMENTS

| | | |
|---|---|---|
| CN | 102149061 A | 8/2011 |
| CN | 102257847 A | 11/2011 |
| CN | 102892078 A | 1/2013 |

OTHER PUBLICATIONS

International Search Report for corresponding application PCT/CN2014/072620 filed Feb. 27, 2014; dated May 28, 2014.

* cited by examiner

*Primary Examiner* — Moustapha Diaby
(74) *Attorney, Agent, or Firm* — Cantor Colburn LLP

(57) ABSTRACT

Provided are methods and devices for reporting a broadcast state of a warning message. In the method, an evolved Node B (eNB) receives a state request message from a Mobile Management Entity (MME), wherein the state request message is used for requesting to report a broadcast state of a warning message; in response to the state request message, the eNB reports the broadcast state of the warning message to the MME. By means of the technical solution, the effect that a network side can report a broadcast state of a warning message according to a state request from a Cell Broadcast Center (CBC) is achieved.

15 Claims, 5 Drawing Sheets

An eNB sends a broadcast state of a warning message to an MME initiatively — S1002

Reporting component 50

METHODS AND DEVICES FOR REPORTING BROADCAST STATE OF WARNING MESSAGE

TECHNICAL FIELD

The present disclosure relates to the field of communications, particularly to methods and devices for reporting a broadcast state of a warning message.

BACKGROUND

A Public Warning System (PWS), which is a system for warning disasters and other emergencies, is able to publish warning messages to users timely and accurately when a disaster, such as an earthquake, a tsunami, a hurricane, and a wildfire, is encountered, so that the users can take appropriate actions to protect themselves and their families from serious injuries or deaths or avoid serious property loss. A PWS defined in the 3rd Generation Partnership Project (3GPP) can be applied in different communication systems, such as a Global System of Mobile communication (GSM), a Universal Mobile Telecommunication System (UMTS) and a Long Term Evolution (LTE) communication system. The PWS includes an Earthquake and Tsunami Warning System (ETWS), a Commercial Mobile Alert System (CMAS) and an Emergency Alert System (EAS).

FIG. 1 shows a basic network architecture of a PWS in an Evolved Universal Mobile Telecommunications System Terrestrial Radio Access Network (E-UTRAN) of LTE (FIG. 1 is a schematic diagram of a network architecture of a PWS in an E-UTRAN according to a related technology). In the network architecture, a Cell Broadcast Entity (CBE), which does not belong to a communication network defined by the 3GPP, is mainly responsible for formatting Cell Broadcast Service (CBS) messages; a Cell Broadcast Center (CBC), which is a part of a core network, is responsible for managing CBS messages, including: distribution of a Serial Number, and modification and deletion of a CBS message of an evolved Node B (eNB), determination of a cell to which a CBS message is broadcast, determination of time when a CBS message starts to be broadcast, determination of time when the CBS message stops being broadcast, and determination of a broadcast period of a CBS message and so on. Besides general functions, a Mobility Management Entity (MME) is also responsible for explaining a command from the CBC, storing a message from the CBC, returning an acknowledgement to the CBC after successfully executing the command received from the CBC, reporting a failure to the CBC when the command received from the CBC is not understood or not executed, and routing a warning message to an appropriate eNB in an indicated Tracking Area (TA). An eNB is mainly responsible for broadcasting the warning message received from the MME to User Equipment (UE) residing in a related area to which the eNB belongs. The CBC may be coupled with a plurality of MMEs, and may also be coupled with a plurality of CBEs. The CBC is coupled with an MME through a SBc interface. The MME is coupled with the eNB through an S1-MME interface. The eNB is coupled with the UE through a Uu port. An interface between the CBE and the CBC is not specified in 3GPP standards.

FIG. 2 is a flowchart of transmitting a warning message in an E-UTRAN in a related technology. As shown in FIG. 2, the flow includes the following steps.

Step S200: A network registration and security procedure is executed. An UE stores a flag for indicating whether authentication to the network is required. This step is executed each time when the UE is attached to the network.

Step S201: A CBE sends emergency information, such as a "warning type", a "warning message", an "impacted area", or a "time period", to a CBC, and the CBC authenticates the request.

Step S202: By using information of the "impacted area", the CBC identifies MMEs to which a warning message needs to be sent. The CBC sends a Write-Replace Warning Request message to these MMEs, wherein the Write-Replace Warning Request message includes a broadcast warning message and transmission attributes (the transmission attributes including a Message Identifier, a Serial Number, a Tracking Area ID list (used in the MME only and used by the MME to select eNBs to which the Write-Replace Warning Request message is sent), a warning area (which is a cell identifier list, or a Tracking Area identifier list or one or more emergency area identifiers), and a Send Write-Replace-Warning-Indication (which needs to be set by the CBC when the CBC requires the MME to send a Write-Replace Warning Indication message including a Broadcast Scheduled Area List Information Element (IE)).

Step S203: The MME sends a Write-Replace Warning Confirm message to the CBC to indicate that the MME has started allocating the warning message to the eNBs. The Write-Replace Warning Confirm message may include an Unknown Tracking Area List IE indicating Tracking Areas which are unknown to the MME and to which the request cannot be sent.

Step S204: Upon receiving the Write-Replace Warning Confirm message from the MME, the CBC may send an Emergency Broadcast Response message to the CBE to acknowledge that publishing of the warning message has been started.

Step S205: The MME forwards the Write-Replace Warning Request message to the eNBs, and uses the Tracking Area ID list to determine the eNBs for transmitting the warning message.

Step S206: When there is an S1-flex at the eNB so that the eNB can receive the same warning message from a plurality of MMEs, the eNB may discover a repeated message by verifying Message Identifiers and Serial Numbers in warning messages. Only the first received message will be broadcast by a cell if a redundant message is discovered. The eNB uses warning area information to decide cells to which the warning message is broadcast. The eNB returns a Distribute Warning Message Response message to the MME.

Step S207: If the UE has been configured to receive the warning message and has been authenticated by a core network, the UE will use a value of the "warning type" (an "earthquake", a "tsunami", or an "earthquake and tsunami") to warn a user immediately.

Step S208: If the Send Warning-Message-Indication parameter is included in the Write-Replace Warning Request sent by the CBC to the MME, the MME needs to include Broadcast Scheduled Area Lists in the Write-Replace Warning Indication message sent to the CBC, wherein the Broadcast Scheduled Area Lists includes: contents in Broadcast Completed Area Lists received by the MME from eNBs. The MME may combine the Broadcast Completed Area Lists received from the eNBs.

Step S209: The MME decides whether transmission of the warning message succeeds or fails, and creates a tracking report.

FIG. 3 is a flowchart of cancelling a warning message in an E-UTRAN in a related technology. A shown in FIG. 3, the flow includes the following steps.

Step S301: A CBE sends a Stop Emergency Broadcast Request message to a CBC, wherein the message includes: a Message Identifier and a Serial Number.

Step S302: The CBC identifies MMEs to which a stop warning message needs to be sent. The CBC sends a Stop Write-Replace Warning Request message to these MMEs, wherein the Stop Write-Replace Warning Request message includes a Message Identifier, a Serial Number, a Tracking Area ID list and a warning area.

Step S303: The MMEs send a Stop Warning Confirm message, wherein the message is used for notifying the CBC that the MMEs have started allocating a Kill Request message to eNBs.

Step S304: After receiving the Stop Warning Confirm message from the MMEs, the CBC may send a Stop Emergency Broadcast Response message to the CBE to acknowledge that a warning message cancelling process has been initialized.

Step S305: The MMEs send the Kill Request message to the eNBs, in the process, the MMEs may use the Tracking Area ID list to decide the eNBs that are broadcasting a warning message.

Step S306: Each eNB stops a warning message which is identified by a Message Identifier and a Serial Number and being broadcast in an area identified by a Warning Area ID, and returns a Kill Response message to the MME.

Step S307: The MMEs create a tracking record about cancelling the message.

At present, a broadcast state of a warning message at a network side needs to be reported in the following scenarios: (1) As required by the Netherlands Government on NL-Alert, the Netherlands Government needs to know a network state and whether an NL-Alert message is published successfully; (2) A CBC considers that a broadcast message has been cancelled and references (a Message Identifier and a Serial Number) of the warning message have been deleted, however, cancellation at the network side fails due to an unknown reason, which will result in inconsistency of states at the network side and the CBC side, and an operator may require reporting the state at the network side. Nevertheless, until now, the related technology has by no means provided a method capable of reporting a broadcast state of a warning message by a network side.

Currently, there is no effective solution yet for the problem that a method for reporting a broadcast state of a warning message by a network side is not provided by a related technology.

SUMMARY

The embodiments of the present disclosure provide methods and devices for reporting a broadcast state of a warning message to at least solve the problem above.

A method for reporting a broadcast state of a warning message is provided according to an aspect of the embodiments of present disclosure, including that an eNB receives a state request message from an MME, wherein the state request message is used for requesting to report a broadcast state of a warning message; in response to the state request message, the eNB reports the broadcast state of the warning message to the MME.

In an example embodiment, the state request message contains one of the followings: a reporting attribute of the warning message, a reporting period of the warning message, and the reporting attribute of the warning message as well as the reporting period of the warning message.

In an example embodiment, the broadcast state of the warning message includes: a broadcast state of each warning message in all warning messages, or a broadcast state of each warning message in one or more designated warning messages, wherein the broadcast state of each warning message in all warning messages include: an attribute of each warning message being reported in a current moment, and/or an attribute of each warning message that has been broadcast within a preset time interval before the current moment; the broadcast state of each warning message in the one or more predetermined warning messages is a broadcast state of each warning message in one or more designated warning messages that need to be reported.

In an example embodiment, when the state request message contains the reporting attribute of the warning message, the eNB reporting the broadcast state of the warning message to the MME includes that the eNB sends the broadcast state of the warning message to the MME through a state response message, wherein in a case that an attribute content of the reporting attribute of the warning message contained in the state request message is not null, the broadcast state of the warning message is the broadcast state of the warning message corresponding to the attribute content; and in a case that the attribute content of the reporting attribute of the warning message contained in the state request message is null, the broadcast state of the warning message is all broadcast states or one or more preset broadcast states of the warning message.

In an example embodiment, when the state request message contains the reporting period of the warning message, the eNB reporting the broadcast state of the warning message to the MME includes that the eNB sends one or more preset broadcast states of the warning message to the MME through a state response message according to the reporting period of the warning message contained in the state request message.

In an example embodiment, when the state request message contains the reporting attribute of the warning message as well as the reporting period of the warning message, the eNB reporting the broadcast state of the warning message to the MME includes that the eNB sends the broadcast state of the warning message to the MME through a state response message according to the reporting period of the warning message contained in the state request message, wherein in a case that an attribute content of the reporting attribute of the warning message contained in the state request message is not null, the broadcast state of the warning message is the broadcast state of the warning message corresponding to the attribute content; and in a case that the attribute content of the reporting attribute of the warning message contained in the state request message is null, the broadcast state of the warning message is all broadcast states or one or more preset broadcast states of the warning message.

In an example embodiment, when an attribute content of the reporting attribute of the warning message contained in the state request message is not null, the attribute content includes at least one of the followings: a Message Identifier IE and a Serial Number IE for identifying the warning message; a Broadcast Completed Area List IE for indicating areas in which the warning message is broadcast successfully; a Repetition Period IE for indicating a broadcast period of the warning message; and a Number of Broadcast Requested IE for indicating the number of broadcasting times of the warning message.

In an example embodiment, the state request message is sent by a CBC to the MME.

In an example embodiment, in a case that the eNB fails in processing the state request message, the eNB returns a state response failure message to the MME, wherein the state response failure message includes: a failure cause and/or a waiting time.

A device for reporting a broadcast state of a warning message is provided according to another aspect of the embodiments of present disclosure, located in an eNB and including: a receiving component, configured to receive a state request message from an MME, wherein the state request message is used for requesting to report a broadcast state of a warning message; a processing component, configured to, in response to the state request message, report the broadcast state of the warning message to the MME.

In an example embodiment, the state request message contains one of the followings: a reporting attribute of the warning message, a reporting period of the warning message, and the reporting attribute of the warning message as well as the reporting period of the warning message.

In an example embodiment, the broadcast state of the warning message includes: a broadcast state of each warning message in all warning messages, or a broadcast state of each warning message in one or more designated warning messages, wherein the broadcast state of each warning message in all warning messages include: an attribute of each warning message being reported in a current moment, and/or an attribute of each warning message that has been broadcast within a preset time interval before the current moment; the broadcast state of each warning message in the one or more predetermined warning messages is a broadcast state of each warning message in one or more designated warning messages that need to be reported.

In an example embodiment, when an attribute content of the reporting attribute of the warning message contained in the state request message is not null, the attribute content includes at least one of the followings: a Message Identifier IE and a Serial Number IE for identifying the warning message; a Broadcast Completed Area List IE for indicating areas in which the warning message is broadcast successfully; a Repetition Period IE for indicating a broadcast period of the warning message; and a Number of Broadcast Requested IE for indicating the number of broadcasting times of the warning message.

A method for reporting a broadcast state of a warning message is provided according to still another aspect of the embodiments of present disclosure, including that an eNB receives indication information from an MME, wherein the indication information is used for indicating the eNB to report a broadcast state of a warning message; the eNB reports, in response to the indication information, the broadcast state of the warning message to the MME.

A device for reporting a broadcast state of a warning message is provided according to still another aspect of the embodiments of present disclosure, located in an eNB and including: a receiving component, configured to receive indication information from an MME, wherein the indication information is used for indicating the eNB to report a broadcast state of a warning message; a reporting component, configured to, in response to the indication information, report the broadcast state of the warning message to the MME.

A method for reporting a broadcast state of a warning message is provided according to still another aspect of the embodiments of present disclosure, including that an eNB reports a broadcast state of a warning message to an MME initiatively.

A device for reporting a broadcast state of a warning message is provided according to still another aspect of the embodiments of present disclosure, located in an eNB and including: a reporting component, configured to report a broadcast state of a warning message to an MME initiatively.

By means of the embodiments of the present disclosure, after an eNB responds to a state request message which is sent from a CBC and forwarded by an MME and used for requesting to report a broadcast state of a warning message, the MME reports the broadcast state of the warning message to the CBC, thereby solving the problem that a method for reporting a broadcast state of a warning message by a network side is not provided by a related technology, and achieving the effect that a network side can report a broadcast state of a warning message according to a state request from a CBC.

BRIEF DESCRIPTION OF THE DRAWINGS

The accompanying drawings illustrated herein are used for providing further understanding to the present disclosure and constitute a part of the application. The exemplary embodiments of the present disclosure and illustration thereof are used for explaining the present disclosure, instead of constituting improper limitation to the present disclosure. In the accompanying drawings.

DETAILED DESCRIPTION OF THE EMBODIMENTS

The present disclosure will be expounded hereinafter with reference to the accompanying drawings and in conjunction with the embodiments. It needs to be noted that the embodiments in the application and the characteristics in the embodiments may be combined with each other if there is no conflict.

Figures 1, 2:
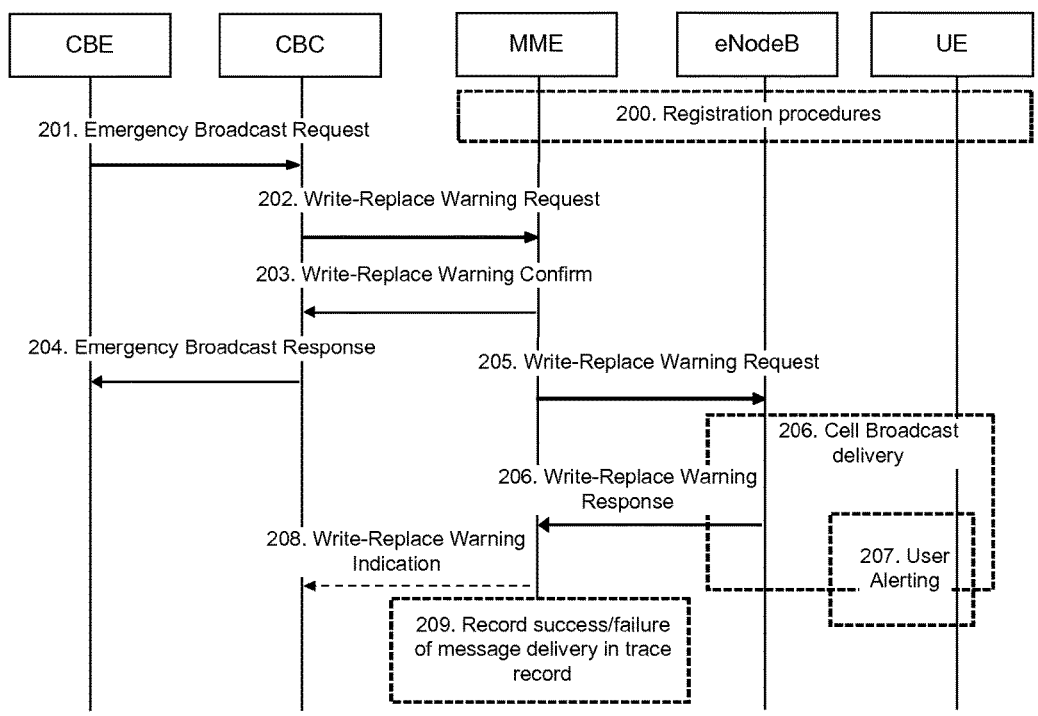
FIG. 1 is a schematic diagram of a network architecture of a PWS in an E-UTRAN according to a related technology.
FIG. 2 is a flowchart of transmitting a warning message in an E-UTRAN according to a related technology.
Figure 3:
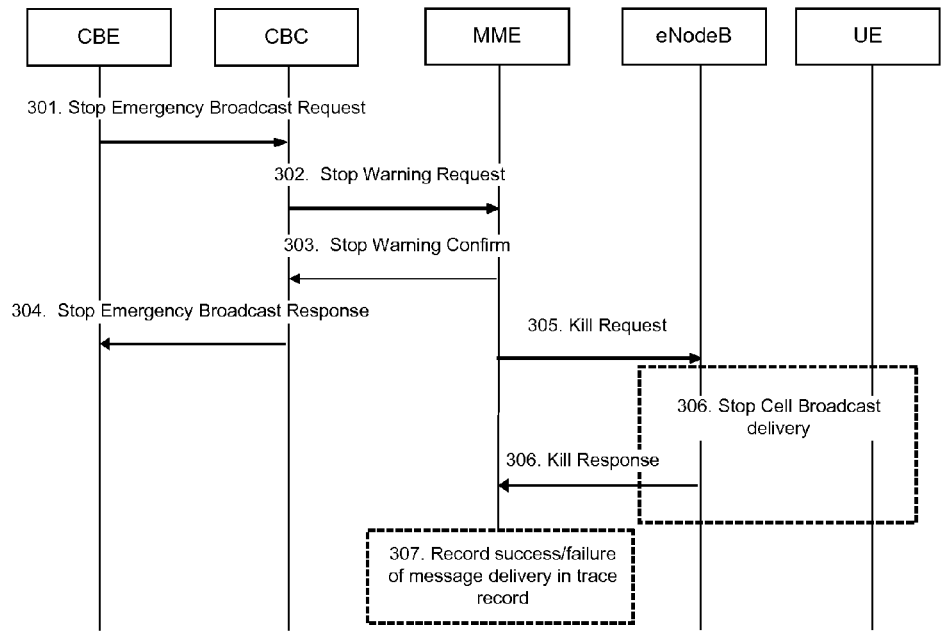
FIG. 3 is a flowchart of cancelling a warning message in an E-UTRAN according to a related technology.
Figure 4:
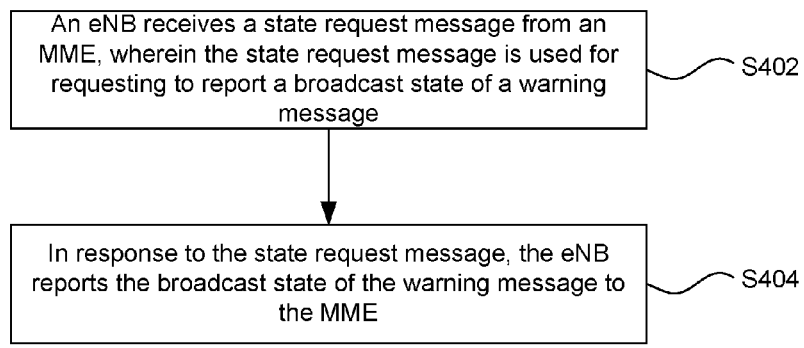
FIG. 4 is a flowchart of a method for reporting a broadcast state of a warning message according to the first embodiment of the present disclosure.

FIG. 4 is a flowchart of a method for reporting a broadcast state of a warning message according to the first embodiment of the present disclosure. As shown in FIG. 4, the method mainly includes the following steps (Step S402 to Step S404).

Step S402: An eNB receives a state request message from an MME, wherein the state request message is used for requesting to report a broadcast state of a warning message.

Step S404: In response to the state request message, the eNB reports the broadcast state of the warning message to the MME.

The problem that a method for reporting a broadcast state of a warning message by a network side is not provided by a related technology can be solved through the foregoing steps, thus achieving the effect that a network side can report a broadcast state of a warning message according to a state request from a CBC.

In the present embodiment, the state request message may contain one of the followings: a reporting attribute of the warning message, a reporting period of the warning message, and the reporting attribute of the warning message as well as the reporting period of the warning message. In other words, the state request message may only contain the reporting attribute of the warning message, so that the eNB responding to the state request message only needs to report an attribute content of the warning message corresponding to the reporting attribute of the warning message as required by the requester CBC. The state request message may also contain the reporting period of the warning message only. Of course, the state request message may contain the reporting attribute of the warning message as well as the reporting period of the warning message at the same time.

In the present embodiment, the broadcast state of the warning message may include: a broadcast state of each warning message in all warning messages, or a broadcast state of each warning message in one or more designated warning messages, wherein the broadcast state of each warning message in all warning messages may include: an attribute of each warning message being reported in a current moment, and/or an attribute of each warning message that has been broadcast within a preset time interval before the current moment; the broadcast state of each warning message in the one or more predetermined warning messages is a broadcast state of each warning message in one or more designated warning messages that need to be reported.

In an example embodiment, when the state request message contains the reporting attribute of the warning message, the eNB reporting the broadcast state of the warning message to the MME may be implemented in such a method that the eNB sends the broadcast state of the warning message to the MME through a state response message, wherein in a case that an attribute content of the reporting attribute of the warning message contained in the state request message is not null, the broadcast state of the warning message is the broadcast state of the warning message corresponding to the attribute content; and in a case that the attribute content of the reporting attribute of the warning message contained in the state request message is null, the broadcast state of the warning message is all broadcast states or one or more preset broadcast states of the warning message.

In another example embodiment, when the state request message contains the reporting period of the warning message, the operation that the eNB reports the broadcast state of the warning message to the MME may be implemented in such a method that the eNB sends one or more preset broadcast states of the warning message to the MME through a state response message according to the reporting period of the warning message contained in the state request message.

In still another example embodiment, when the state request message contains the reporting attribute of the warning message as well as the reporting period of the warning message, the eNB reporting the broadcast state of the warning message to the MME includes that the eNB sends the broadcast state of the warning message to the MME through a state response message according to the reporting period of the warning message contained in the state request message, wherein in a case that an attribute content of the reporting attribute of the warning message contained in the state request message is not null, the broadcast state of the warning message is the broadcast state of the warning message corresponding to the attribute content; and in a case that the attribute content of the reporting attribute of the warning message contained in the state request message is null, the broadcast state of the warning message is all broadcast states or one or more preset broadcast states of the warning message.

In the present embodiment, when an attribute content of the reporting attribute of the warning message contained in the state request message is not null, the attribute content may include at least one of the followings: a Message Identifier IE and a Serial Number IE for identifying the warning message; a Broadcast Completed Area List IE for indicating areas in which the warning message is broadcast successfully; a Repetition Period IE for indicating a broadcast period of the warning message; and a Number of Broadcast Requested IE for indicating the number of broadcasting times of the warning message.

In the present embodiment, the state request message is sent by a CBC to the MME. In practical application, since both the MME and the eNB belong to a network side, it means that, when receiving the request message of the CBC, the network side reports a broadcast state of each warning message in all warning messages or a broadcast state of each warning message in one or more designated warning messages (e.g. the broadcast state of each predetermined warning message that needs to be reported and a broadcast state of each warning message corresponding to the request message of the CBC) to the CBC.

In the present embodiment, in a case that the eNB fails in processing the state request message, the eNB returns a state response failure message to the MME, wherein the state response failure message includes: a failure cause and/or a waiting time. In practical application, the eNB may feed back the failure cause of the state response failure only to the MME, and after analyzing the failure cause, the MME may adjust a requesting strategy. The eNB may feed back the waiting time only to the MME so as to notify the MME to initiate a state request message again when the waiting time is out. Of course, the eNB may feed back the failure cause of the state response failure and the waiting time to the MME simultaneously.

The process of reporting a broadcast state of a warning message will be further described below from the perspective of the entire network side and the CBC.

(1) When the CBC requests the network side to report a broadcast state of each warning message in all warning messages, the reporting process includes that the CBC sends a message (e.g. the state request message) to the MME to request for reporting the broadcast states of the warning messages, wherein the message includes reporting attributes of the warning messages and/or warning reporting periods; after receiving the message sent by the CBC to request for reporting the broadcast states of the warning messages, the MME forwards the message to the eNB to request for reporting the broadcast states of the warning messages; and the eNB sends a response message to the MME to report the broadcast states of the warning messages. The eNB reports, in information of a warning message broadcast list of the response message and according to the reporting attributes of the warning messages contained in the message sent by the MME to request for reporting the broadcast states of the warning messages, attributes of all warning messages, within an area of the eNB, that are being broadcast and/or have been broadcast (in a period of time). After receiving the response message which is reported by the eNB and carries the broadcast states of the warning messages in the eNB, the MME forwards a content in the message to the CBC.

(2) When the CBC requests the network side to report a broadcast state of each warning message in one or more specific warning messages, the reporting process includes that the CBC sends a message to the MME to request for reporting the broadcast state of each specific warning message, wherein the sent message includes information indicating the one or more specific warning messages, a reporting attribute of the warning message and/or a warning reporting period. After receiving the message sent by the CBC to request for reporting the broadcast states of the one or more specific warning messages, the MME sends a message to the eNB to request for reporting the broadcast state of the one or more specific warning messages, wherein the sent message includes information indicating the one or more specific warning messages, a reporting attribute of the warning message and/or a warning reporting period. The eNB sends a response message to report the broadcast states of the one or more specific warning messages to the MME, wherein the eNB may report, in information of a warning message broadcast list of the response message and according to the reporting attribute of the warning message contained in the message sent by the MME to request for reporting the broadcast states of the one or more specific warning messages, attributes of each warning message that is being broadcast and/or has been broadcast (in a certain time interval) in the one or more designated warning messages in an area of the eNB. After receiving the message reported by the eNB to report the broadcast state of the warning message in the eNB, the MME forwards a content of the message to the CBC.

A request and response process at the internal of the network side (i.e., between the MME and the eNB) may be implemented by such a method: (1) a request process may include: the MME sends a message (which is from the CBC) to the eNB to request for reporting a broadcast state of a warning message, wherein the sent message includes a reporting attribute of the warning message (the reporting attribute of the warning message may include: a Message Identifier IE and a Serial Number IE for identifying the warning message, and/or a Broadcast Completed Area List IE for indicating an area where the warning message is broadcast successfully, and/or a Repetition Period IE for indicating a broadcast period of the warning message, and/or a Number of Broadcast Requested IE for indicating the number of broadcasting times of the warning message, and so on, wherein the reporting attribute of the warning message contained in the sent message may be indicated in a form of a bitmap); of course, the reporting attribute of the warning message may also not include any content; (2) a response process includes that the eNB sends a response message to the MME to report the broadcast state of the warning message; the eNB reports, in information of a warning message broadcast list of the response message and according to the reporting attribute of the warning message contained in the message sent by the MME to request for reporting the broadcast state of the warning message, an attribute of the warning message, wherein if the reporting attribute of the warning message contained in the message sent by the MME to the eNB to request for reporting the broadcast state of the warning message includes the Message Identifier IE and the Serial Number IE identifying the warning message, and/or the Broadcast Completed Area List IE for indicating the area where the warning message is broadcast successfully, and/or the Repetition Period IE for indicating the broadcast period of the warning message, and/or the number of the broadcast requested IEs for indicating the number of the broadcasting times of the message, and so on, then the eNB includes attributes of the warning message in the information of the warning message broadcast list of the response message, and these attributes are the attributes requested in the reporting attribute of the warning message contained in the request message; and if the reporting attribute of the warning message contained in the message sent by the MME to the eNB to request for reporting the broadcast state of the warning message does not include any content, then the eNB includes attributes of a warning message in an area of the eNB in the information of the warning message broadcast list of the response message, and these attributes may include the Message Identifier IE and the Serial Number IE and so on for identifying the warning message.

Figure 5:
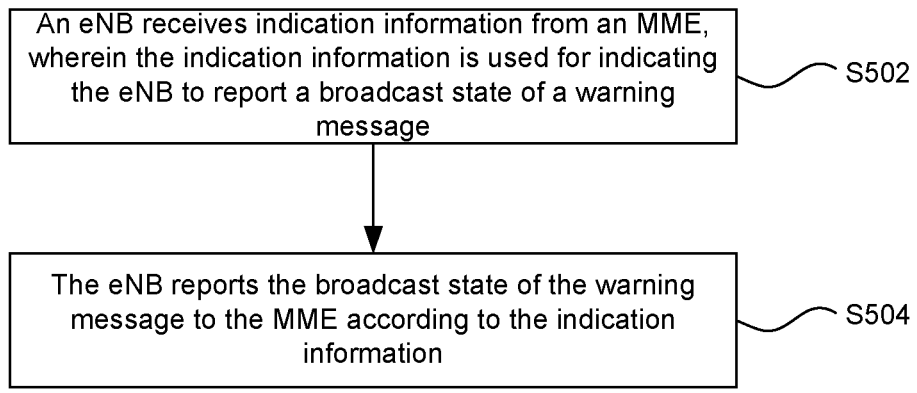
FIG. 5 is a flowchart of a method for reporting a broadcast state of a warning message according to the second embodiment of the present disclosure.

FIG. 5 is flowchart of a method for reporting a broadcast state of a warning message according to the second embodiment of the present disclosure. As shown in FIG. 5, the method mainly includes the following steps (Step S502 to Step S504).

Step S502: An eNB receives indication information from an MME, wherein the indication information is used for indicating the eNB to report a broadcast state of a warning message.

Step S504: The eNB reports, in response to the indication information, the broadcast state of the warning message to the MME.

In practical application, since both the eNB and the MME are located at a network side, which means that the process of reporting the broadcast state of the warning message is executed by the network side according to a CBC: (1) the CBC may add an indicator in an existing message (mainly referring to a message applied in an interaction scenario of the CBC and the network side, and not limited to a certain specific message) so as to trigger the MME to subsequently send an indicator to the eNB to request the eNB to report the broadcast state of the warning message; the MME may also trigger, by means of adding an indicator in an existing message, the eNB to subsequently report the broadcast state of the warning message to the MME; (2) after receiving the message which is forwarded or sent by the MME and carries the indicator, the eNB sends a response message to the MME to report the broadcast state of the warning message in the eNB; (3) after receiving a message carrying the broadcast state of the warning message in the eNB, which is reported by the eNB, the MME forwards a content in the message to the CBC.

The method for reporting a broadcast state of a warning message according to the first embodiment, and the method for reporting a broadcast state of a warning message according to the second embodiment will be described in more details below in conjunction with FIG. 6 and FIG. 7 and the first example embodiment to the third example embodiment.

Figure 6:
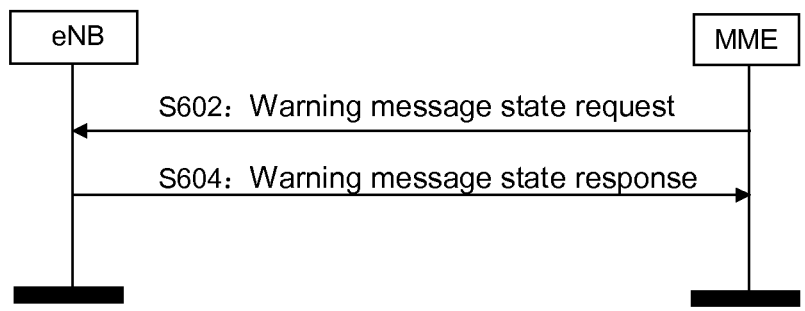
FIG. 6 is a schematic diagram of a process in which an MME forwards to an eNB a warning message state request initiated by a CBC and the eNB responds to the warning message state request in a flow of reporting a broadcast state of a warning message according to the first example embodiment, the second example embodiment and the third example embodiment of the present disclosure.

FIG. 6 is a schematic diagram of a process in which an MME forwards to an eNB a warning message state request initiated by a CBC and the eNB responds to the warning message state request in a flow of reporting a broadcast state of a warning message according to the first example embodiment, the second example embodiment and the third example embodiment of the present disclosure. FIG. 7 is a schematic diagram of a process in which a CBC sends to an MME a request for a state of the warning message and the MME responds to the state request in a flow of reporting a broadcast state of a warning message according to the first example embodiment, the second example embodiment and the third example embodiment of the present disclosure. It should be noted, before describing the following three example embodiments, that FIG. 6 and FIG. 7 only illustrate general steps (common steps) executed by the three example embodiments and differences in the three example embodiments will be shown by description of the following content.

A brief flow as shown in FIG. 6 includes the following two steps (Step S602 to Step S604).

Step S602: An MME sends to an eNB a request for a state of a warning message.

Step S604: The eNB sends to the MME a response of the state of the warning message.

Figure 7:
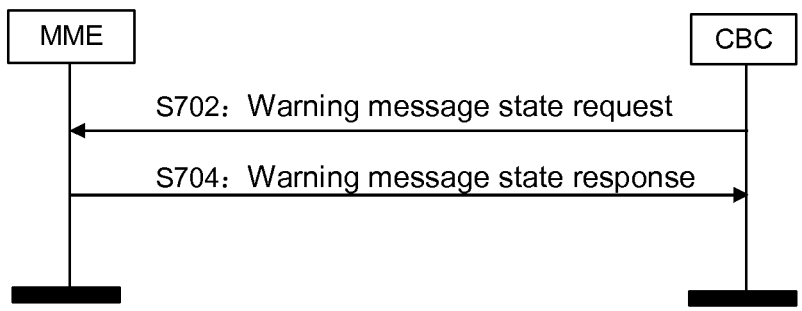
FIG. 7 is a schematic diagram of a process in which a CBC sends to an MME a request for a state of the warning message and the MME responds to the state request in a flow of reporting a broadcast state of a warning message according to the first example embodiment, the second example embodiment and the third example embodiment of the present disclosure.

A brief flow as shown in FIG. 7 includes the following two steps (Step S702 to Step S704).

Step S702: A CBC sends to an MME a request for a state of the warning message.

Step S704: The MME sends to the CBC a response of the state of the warning message.

Example Embodiment 1

It needs to be noted that the present example embodiment includes two processes (the processes as shown in FIG. 6 and FIG. 7): one process is between a CBC and an MME, in which the CBC requests the MME to report a broadcast state of a warning message and the other process is between the MME and an eNB, in which the MME requests the eNB to report the broadcast state of the warning message.

Please refer to FIG. 6, the interaction flow between the MME and the eNB in the present example embodiment mainly includes:

(1) The MME sends a message to request for reporting a broadcast state of a warning message, wherein the message may be a warning message state request message as shown in FIG. 6. The message may include a reporting attribute of the warning message, such as a Message Identifier IE and a Serial Number IE for identifying the warning message, and/or a Broadcast Completed Area List IE for indicating an area where the warning message is broadcast successfully, and/or a Repetition Period IE for indicating a broadcast period of the warning message, and/or a Number of Broadcast Requested IE for indicating the number of broadcasting times of the warning message, and so on, wherein the reporting attributes of the warning message listed above may be indicated in a form of a bitmap. The message may also include a warning reporting period, such as a Reporting Periodicity IE, so that the eNB uses the setting as an interval for two times of reporting.

(2) The eNB sends a response message to the MME to report the broadcast state of the warning message in the eNB, wherein the message may be a warning message state response message as shown in FIG. 6. The message may include information of a warning message broadcast list, wherein the information of the warning message broadcast list may include attributes of all warning messages in an area of the eNB that are being broadcast and/or have been broadcast (in a certain period of time), and these attributes are the attributes requested in the request message of Step S602, and may include the Message Identifier IE and the Serial Number IE for identifying the warning message in Step S602, and/or the Broadcast Completed Area List IE for indicating the area where the warning message is broadcast successfully, and/or the Repetition Period IE for indicating the broadcast period of the warning message, and/or the number of the broadcast requested IEs for indicating the number of the broadcasting times of the message, and so on.

Please refer to FIG. 7, the interaction flow between the CBC and the MME in the present example embodiment mainly includes:

(1) The CBC sends a message to the MME to request for reporting a broadcast state of a warning message, wherein the message may be a warning message state request message as shown in FIG. 7. Besides information included in Step S602, the message should further include a Tracking Area Identity (TAI) list. The list may be used at the MME to select eNBs to which the message to request for reporting the broadcast state of the warning message is sent.

(2) After receiving a message which is reported by an eNB and indicates a broadcast state of a warning message in the eNB, the MME forwards a content in the message to the CBC, wherein the message mentioned in the present step may be a warning message state response message as shown in FIG. 7.

Example Embodiment 2

It needs to be noted that the present example embodiment includes two processes (the processes as shown in FIG. 6 and FIG. 7): one process is between a CBC and an MME, in which the CBC requests the MME to report a broadcast state of a warning message and the other process is between the MME and an eNB, in which the MME requests the eNB to report the broadcast state of the warning message.

Please refer to FIG. 6, the interaction flow between the MME and the eNB in the present example embodiment mainly includes:

(1) The MME sends a message to the eNB to request for reporting a broadcast state of a warning message, wherein the message may be a warning message state request message as shown in FIG. 6. The message may include a reporting attribute of the warning message, but the reporting attribute may not include any content, which means that the eNB needs to report warning messages being broadcast in all service cells. The message may also include a warning reporting period, such as a Reporting Periodicity IE, so that the eNB uses the setting as an interval for two times of reporting.

(2) The eNB sends a response message to the MME to report the broadcast state of the warning message in the eNB, wherein the message may be a warning message state response message as shown in FIG. 4. The message may include information of a warning message broadcast list.

The information of the warning message broadcast list may include attributes of all warning messages in an area of the eNB that are being broadcast and/or have been broadcast (in a certain period of time), wherein the attributes may include a Message Identifier IE and a Serial Number IE for identifying each warning message and so on.

Please refer to FIG. 7, the interaction flow between the CBC and the MME in the present example embodiment mainly includes:

(1) The CBC sends a message to the MME to request for reporting a broadcast state of a warning message, wherein the message may be a warning message state request message as shown in FIG. 7. Besides information included in Step S602, the message should further include a TAI list. The list may be used at the MME to select eNBs to which the message to request for reporting the broadcast state of the warning message is sent.

(2) After receiving a message which is reported by an eNB and indicates a broadcast state of a warning message in the eNB, the MME forwards a content in the message to the CBC, wherein the message mentioned in the present step may be a warning message state response message as shown in FIG. 7.

Example Embodiment 3

It needs to be noted that the present example embodiment includes two processes (the processes as shown in FIG. 6 and FIG. 7): one process is between a CBC and an MME, in which the CBC requests the MME to report a broadcast state of a warning message and the other process is between the MME and an eNB, in which the MME requests the eNB to report the broadcast state of the warning message.

Please refer to FIG. 6, the interaction flow between the MME and the eNB in the present example embodiment mainly includes:

(1) The MME sends a message to the eNB to request for reporting a broadcast state of a warning message, wherein the message may be a warning message state request message as shown in FIG. 6. One or more designated warning messages may be identified in the message. For example, one or more specific warning messages are designated by using one or more Message Identifier IEs and one or more Serial Number IEs. The message may include a reporting attribute of the warning message, such as a Broadcast Completed Area List IE for indicating areas in which the warning message is broadcast successfully, and/or a Repetition Period IE for indicating a broadcast period of the warning message; and/or a Number of Broadcast Requested IE for indicating the number of broadcasting times of the warning message, and so on. The listed reporting attributes of the warning message may be indicated in a form of a bitmap. The message may also include a warning reporting period, such as a Reporting Periodicity IE, so that the eNB uses the setting as an interval for two times of reporting.

(2) The eNB sends a response message to the MME to report the broadcast state of the warning message in the eNB, wherein the message may be a warning message state response message as shown in FIG. 6. The message may include information of a warning message broadcast list. The information of the warning message broadcast list may include attributes of designated warning messages that are being broadcast and/or have been broadcast (in a certain period of time) in an area of the eNB. These attributes are requested by the request message in Step S602, and may include the Broadcast Completed Area List IE for indicating the area in which the warning message is broadcast successfully, and/or the Repetition Period IE for indicating the broadcast period of the warning message, and/or the number of the broadcast requested IEs, indicating the broadcast number of the message, and so on as mentioned in Step S602.

Please refer to FIG. 7, the interaction flow between the CBC and the MME in the present example embodiment mainly includes:

(1) The CBC sends a message to the MME to request for reporting a broadcast state of a warning message, wherein the message may be a warning message state request message as shown in FIG. 7. Besides information included in Step S602, the message may further include a TAI list. The list may be used at the MME to select eNBs to which the message to request for reporting the broadcast state of the warning message is sent.

(2) After receiving a message which is reported by an eNB and indicates a broadcast state of a warning message in the eNB, the MME forwards a content in the message to the CBC, wherein the message mentioned in the present step may be a warning message state response message as shown in FIG. 7.

Example Embodiment 4

(1) An MME may add an indicator in an existing message so as to trigger an eNB to report a broadcast state of a warning message to the MME subsequently. In such a case, a reporting attribute and reporting period of the warning message may be limited in advance. The eNB sends a response message to the MME to report the broadcast state of the warning message in the eNB. (2) A CBC may add an indictor in an existing message so as to trigger the MME to send the indicator to the eNB to request the eNB to report the broadcast state of the warning message. After receiving the message which is reported by the eNB and indicates the broadcast state of the warning message in the eNB, the MME forwards a content in the message to the CBC.

The problem that a method for reporting a broadcast state of a warning message by a network side is not provided by a related technology can be solved by the method for reporting a broadcast state of a warning message according to the embodiments above, thereby achieving the effect that a network side can report a broadcast state of a warning message according to a state request from a CBC.

Figure 8:
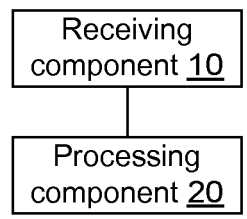
FIG. 8 is a structural block diagram of a device for reporting a broadcast state of a warning message according to the first embodiment of the present disclosure.

FIG. 8 is a structural block diagram of a device for reporting a broadcast state of a warning message according to the first embodiment of the present disclosure. The device is located in an eNB and configured to implement the method for reporting a broadcast state of a warning message according to the first embodiment. As shown in FIG. 8, the device mainly includes: a receiving component 10 and a processing component 20, wherein the receiving component 10 is configured to receive a state request message from an MME, wherein the state request message is used for requesting to report a broadcast state of a warning message; the processing component 20 is configured to, in response to the state request message, report the broadcast state of the warning message to the MME.

In the present embodiment, the state request message may include one of the followings: a reporting attribute of the warning message, a reporting period of the warning message, and the reporting attribute of the warning message as well as the reporting period of the warning message. The broadcast state of the warning message may include: a broadcast state of each warning message in all warning messages, or a broadcast state of each warning message in one or more designated warning messages, wherein the broadcast state of each warning message in all warning messages include: an attribute of each warning message being reported in a current moment, and/or an attribute of each warning message that has been broadcast within a preset time interval before the current moment; the broadcast state of each warning message in the one or more designated warning messages is a broadcast state of each warning message in one or more designated warning messages that need to be reported.

In an example embodiment, when an attribute content of the reporting attribute of the warning message contained in the state request message is not null, the attribute content includes at least one of the followings: a Message Identifier IE and a Serial Number IE for identifying the warning message; a Broadcast Completed Area List IE for indicating areas in which the warning message is broadcast successfully; a Repetition Period IE for indicating a broadcast period of the warning message; and the number of broadcast requested IEs indicating the number of broadcasting times of the message.

Figure 9:
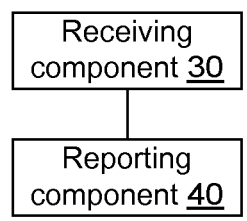
FIG. 9 is a structural block diagram of a device for reporting a broadcast state of a warning message according to the second embodiment of the present disclosure.

FIG. 9 is a structural block diagram of a device for reporting a broadcast state of a warning message according to the second embodiment of the present disclosure. The device is located in an eNB and configured to implement the method for reporting a broadcast state of a warning message according to the second embodiment. As shown in FIG. 9, the device mainly includes: a receiving component 30 and a reporting component 40, wherein the receiving component 30 is configured to receive indication information from an MME, wherein the indication information is used for indicating the eNB to report a broadcast state of a warning message; the reporting component 40 is configured to, in response to the indication information, report the broadcast state of the warning message to the MME.

The problem that a method for reporting a broadcast state of a warning message by a network side is not provided by a related technology can be solved by the device for reporting a broadcast state of a warning message according to the embodiments above, thereby achieving the effect that a network side can report a broadcast state of a warning message according to a state request from a CBC.

Figures 10, 11:
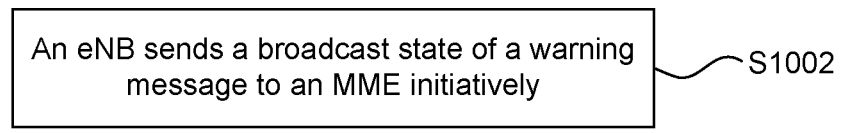
FIG. 10 is a flowchart of a method for reporting a broadcast state of a warning message according to the third embodiment of the present disclosure.
FIG. 11 is a structural block diagram of a device for reporting a broadcast state of a warning message according to the third embodiment of the present disclosure.

FIG. 10 is a flowchart of a method for reporting a broadcast state of a warning message according to the third embodiment of the present disclosure. As shown in FIG. 10, the method mainly includes the following steps (Step S1002).

Step S1002: An eNB sends a broadcast state of a warning message to an MME initiatively.

FIG. 11 is a structural block diagram of a device for reporting a broadcast state of a warning message according to the third embodiment of the present disclosure. The device is located in an eNB and configured to implement the method for reporting a broadcast state of a warning message according to the third embodiment. As shown in FIG. 11, the device includes: a reporting component, configured to report a broadcast state of a warning message to an MME initiatively.

In the third embodiment, the broadcast state of the warning message may include: a broadcast state of each warning message in all warning messages, or a broadcast state of each warning message in one or more designated warning messages, wherein the broadcast state of each warning message in all warning messages may include: an attribute of each warning message being reported in a current moment, and/or an attribute of each warning message that has been broadcast within a preset time interval before the current moment; the broadcast state of each warning message in the one or more predetermined warning messages is a broadcast state of each warning message in one or more designated warning messages that need to be reported.

In the third embodiment, when an attribute content of a reporting attribute of the warning message is not null, the attribute content may include at least one of the followings: a Message Identifier IE and a Serial Number IE for identifying the warning message, a Broadcast Completed Area List IE for indicating areas in which the warning message is broadcast successfully; a Repetition Period IE for indicating a broadcast period of the warning message; and a Number of Broadcast Requested IE for indicating the number of broadcasting times of the warning message.

It may be seen from the foregoing description that the embodiments of the present disclosure achieve the following technical effect: after an eNB responds to a state request message which is sent from a CBC and forwarded by an MME and used for requesting for reporting a broadcast state of a warning message, the MME reports the broadcast state of the warning message to the CBC, thereby solving the problem that a method for reporting a broadcast state of a warning message by a network side is not provided by a related technology, and achieving the effect that a network side can report a broadcast state of a warning message according to a state request from a CBC.

Obviously, those skilled in the art should understand that the components or steps of the present disclosure may be implemented by general computing devices and centralized on a single computing device or distributed on a network consisting of multiple computing devices. Optionally, the components or steps may be implemented by program codes executable by a computing device, so that they may be stored in a storage device and executed by the computing device, and in some cases, the steps as illustrated or described may be executed in a sequence different from those herein, or they may be implemented by respectively fabricating them into integrated circuit components or by fabricating multiple components or steps of them into a single integrated circuit component. By doing so, the embodiments of the present disclosure are not limited to any specific combination of hardware and software.

The above are only example embodiments of the present disclosure, but are used for limiting the present disclosure. For those skilled in the art, the present disclosure may have various modifications and changes. Any modifications, equivalent replacements, improvements and the like made within the principles of the present disclosure shall be included in the scope of protection defined by the claims of the present disclosure.

What is claimed is:

1. A method for reporting a broadcast state of a warning message, comprising:

receiving, by an evolved Node B (eNB), a state request message, or a indication information, or a state request message and a indication information, from a Mobile Management Entity (MME), wherein the state request message is used for requesting to report a broadcast state of a warning message, the indication information is used for indicating the eNB to report a broadcast state of a warning message;

in response to the state request message, or the indication information, or the state request message and the indication information, reporting, by the eNB, the broadcast state of the warning message to the MME;

wherein the state request message contains one of the following: a reporting attribute of the warning message, a reporting period of the warning message, and the reporting attribute of the warning message as well as the reporting period of the warning message;

wherein the broadcast state of the warning message comprises: broadcast state of whole warning messages, or broadcast state of designated warning messages;

wherein when the state request message contains the reporting attribute of the warning message, reporting, by the eNB, the broadcast state of the warning message to the MME comprises: sending, by the eNB, the broadcast state of the warning message to the MME through a state response message, wherein in a case that an attribute content of the reporting attribute of the warning message contained in the state request message is not null, the broadcast state of the warning message is the broadcast state of the whole message of the attribute content; and in a case that the attribute content of the reporting attribute of the warning message contained in the state request message is null, the broadcast state of the warning message is the broadcast state of all warning messages, or the broadcast state of the warning message is the broadcast state of designated warning messages.

2. The method according to claim 1, wherein the broadcast state of each warning message in all the warning messages comprises: an attribute of each warning message being reported in a current moment, or an attribute of each warning message that has been broadcast within a preset time interval before the current moment, or an attribute of each warning message being reported in a current moment and an attribute of each warning message that has been broadcast within a preset time interval before the current moment;

the broadcast state of each warning message in the one or more predetermined warning messages is a broadcast state of each warning message in one or more designated warning messages that need to be reported.

3. The method according to claim 1, wherein when the state request message contains the reporting period of the warning message, reporting, by the eNB, the broadcast state of the warning message to the MME comprises:

sending, by the eNB, one or more preset broadcast states of the warning message to the MME through a state response message according to the reporting period of the warning message contained in the state request message.

4. The method according to claim 1, wherein when the state request message contains the reporting attribute of the warning message as well as the reporting period of the warning message, reporting, by the eNB, the broadcast state of the warning message to the MME comprises:

sending, by the eNB, the broadcast state of the warning message to the MME through a state response message according to the reporting period of the warning message contained in the state request message, wherein in a case that an attribute content of the reporting attribute of the warning message contained in the state request message is not null, the broadcast state of the warning message is the broadcast state of the warning message corresponding to the attribute content; and in a case that the attribute content of the reporting attribute of the warning message contained in the state request message is null, the broadcast state of the warning message is all broadcast states or one or more preset broadcast states of the warning message.

5. The method according to claim 1, wherein when an attribute content of the reporting attribute of the warning message contained in the state request message is not null, the attribute content comprises at least one of the followings:

a Message Identifier Information Element (IE) for identifying the warning message and a Serial Number IE of the warning message;

a Broadcast Completed Area List IE for indicating areas in which the warning message is broadcast successfully;

a Repetition Period IE for indicating a broadcast period of the warning message; and a Number of Broadcast Requested IE for indicating the number of broadcasting times of the warning message.

6. The method according to claim 1, wherein the state request message is sent by a Cell Broadcast Center (CBC) to the MME.

7. The method according to claim 6, wherein in a case that the eNB fails in processing the state request message, the eNB returns a state response failure message to the MME, wherein the state response failure message comprises: a failure cause, or a waiting time, or a failure cause and a waiting time.

8. A device for reporting a broadcast state of a warning message, wherein the device is located in an evolved Node B (eNB) and the device comprises a hardware processor configured to execute program components stored on a memory, wherein the program components comprise:

a first receiving component, connected with a processing component, configured to receive a state request message from a Mobile Management Entity (MME), wherein the state request message is used for requesting to report a broadcast state of a warning message;

the processing component, connected with the first receiving component and configured to, in response to the state request message, report the broadcast state of the warning message to the MME;

or, the device is located in an eNB and the device comprises a hardware processor configured to execute program components stored on a memory, wherein the program components comprise:

a second receiving component, connected with a reporting component and configured to receive indication information from a Mobile Management Entity (MME), wherein the indication information is used for indicating the eNB to report a broadcast state of a warning message;

the reporting component, connected with the second receiving component and configured to, in response to the indication information, report the broadcast state of the warning message to the MME;

or, the device is located in an eNB and the device comprises a hardware processor configured to execute program components stored on a memory, wherein the program components comprise:

the first receiving component, connected with the processing component, configured to receive a state request message from a Mobile Management Entity (MME), wherein the state request message is used for requesting to report a broadcast state of a warning message;

the processing component, connected with the first receiving component, in response to the state request message, report the broadcast state of the warning message to the MME;

the second receiving component, connected with the reporting component configured to receive indication information from a Mobile Management Entity (MME), wherein the indication information is used for indicating the eNB to report a broadcast state of a warning message;

the reporting component, connected with the second receiving component, configured to, in response to the indication information, report the broadcast state of the warning message to the MME;

wherein the state request message contains one of the following: a reporting attribute of the warning message, a reporting period of the warning message, and the reporting attribute of the warning message as well as the reporting period of the warning message;

wherein the broadcast state of the warning message comprises: a broadcast state of whole warning message, or a broadcast state of designated warning messages;

wherein when the state request message contains the reporting attribute of the warning message, reporting, by the eNB, the broadcast state of the warning message to the MME comprises: sending, by the eNB, the broadcast state of the warning message to the MME through a state response message, wherein in a case that an attribute content of the reporting attribute of the warning message contained in the state request message is not null, the broadcast state of the warning message is the broadcast state of the whole message of the attribute content; and in a case that the attribute content of the reporting attribute of the warning message contained in the state request message is null, the broadcast state of the warning message is the broadcast state of all warning messages, or the broadcast state of the warning message is the broadcast state of designated warning messages.

9. The device according to claim 8, wherein the broadcast state of each warning message in all warning messages comprises: an attribute of each warning message being reported in a current moment, and/or an attribute of each warning message that has been broadcast within a preset time interval before the current moment;

the broadcast state of each warning message in the one or more predetermined warning messages is a broadcast state of each warning message in one or more designated warning messages that need to be reported.

10. The device according to claim 9, wherein when the state request message contains the reporting attribute of the warning message, the processing component, connected with the first receiving component, is configured to report the broadcast state of the warning message to the MME in a following manner:

sending the broadcast state of the warning message to the MME through a state response message, wherein in a case that an attribute content of the reporting attribute of the warning message contained in the state request message is not null, the broadcast state of the warning message is the broadcast state of the warning message corresponding to the attribute content; and in a case that the attribute content of the reporting attribute of the warning message contained in the state request message is null, the broadcast state of the warning message is all broadcast states or one or more preset broadcast states of the warning message.

11. The device according to claim 9, wherein when the state request message contains the reporting period of the warning message, the processing component, connected with the first receiving component, is configured to report the broadcast state of the warning message to the MME in a following manner:

sending one or more preset broadcast states of the warning message to the MME through a state response message according to the reporting period of the warning message contained in the state request message.

12. The device according to claim 9, wherein when the state request message contains the reporting attribute of the warning message as well as the reporting period of the warning message, the processing component, connected with the first receiving component, is configured to report the broadcast state of the warning message to the MME in a following manner:

sending the broadcast state of the warning message to the MME through a state response message according to the reporting period of the warning message contained in the state request message, wherein in a case that an attribute content of the reporting attribute of the warning message contained in the state request message is not null, the broadcast state of the warning message is the broadcast state of the warning message corresponding to the attribute content; and in a case that the attribute content of the reporting attribute of the warning message contained in the state request message is null, the broadcast state of the warning message is all broadcast states or one or more preset broadcast states of the warning message.

13. The device according to claim 8, wherein when an attribute content of the reporting attribute of the warning message contained in the state request message is not null, the attribute content comprises at least one of the followings:

a Message Identifier Information Element (IE) for identifying the warning message and a Serial Number IE of the warning message;

a Broadcast Completed Area List IE for indicating areas in which the warning message is broadcast successfully;

a Repetition Period IE for indicating a broadcast period of the warning message; and a Number of Broadcast Requested IE for indicating the number of broadcasting times of the warning message.

14. The device according to claim 8, wherein the state request message is sent by a Cell Broadcast Center (CBC) to the MME.

15. The device according to claim 14, wherein in a case that the processing component, connected with the first receiving component, fails in processing the state request message, the device is configured to return a state response failure message to the MME, wherein the state response failure message comprises: a failure cause and/or a waiting time.

* * * * *